US012293743B2

(12) United States Patent
Waiserfirer Keshet

(10) Patent No.: US 12,293,743 B2
(45) Date of Patent: May 6, 2025

(54) DEVICE AND METHOD FOR CONVERTING A FRETTED INSTRUMENT INTO A FRETLESS INSTRUMENT

(71) Applicant: Gershon Waiserfirer Keshet, Tel Aviv (IL)

(72) Inventor: Gershon Waiserfirer Keshet, Tel Aviv (IL)

( * ) Notice: Subject to any disclaimer, the term of this patent is extended or adjusted under 35 U.S.C. 154(b) by 254 days.

(21) Appl. No.: 18/054,154

(22) Filed: Nov. 10, 2022

(65) Prior Publication Data

US 2023/0147325 A1 May 11, 2023

Related U.S. Application Data

(60) Provisional application No. 63/278,254, filed on Nov. 11, 2021.

(51) Int. Cl.
*G10D 3/06* (2020.01)
*G10D 3/22* (2020.01)

(52) U.S. Cl.
CPC ................ *G10D 3/06* (2013.01); *G10D 3/22* (2020.02)

(58) Field of Classification Search
CPC .. G10D 3/06; G10D 3/22; G10D 1/08; G10D 1/00; G10G 7/00; G19D 3/00
See application file for complete search history.

(56) References Cited

U.S. PATENT DOCUMENTS 6,350,940 B1 2/2002 Upchurch
7,238,870 B2 * 7/2007 Stewart .................... G10D 3/06 84/329

* cited by examiner

*Primary Examiner* — Kimberly R Lockett
(74) *Attorney, Agent, or Firm* — JMB Davis Ben-David

(57) ABSTRACT

A device and method for converting a fretted musical instrument into a fretless instrument is provided. The device is manufactured to the dimensions of the musical instrument and configured to fit between the frets and the strings of the musical instrument. The resulting fretless instrument is easily convertible back to a fretted instrument.

10 Claims, 7 Drawing Sheets

DEVICE AND METHOD FOR CONVERTING A FRETTED INSTRUMENT INTO A FRETLESS INSTRUMENT

CROSS REFERENCE TO RELATED APPLICATIONS

This application claims the benefit of U.S. provisional patent application No. 63/278,254 filed on 11 Nov. 2021 and incorporated by reference as if set forth herein.

FIELD OF THE INVENTION

The present invention generally relates to stringed musical instruments. More particularly, the invention relates to a guitar that is easily convertible between fretted and fretless playing configurations.

BACKGROUND OF THE INVENTION

Stringed musical instruments can generally be categorized as fretted instruments and unfretted instruments.

Fretless instruments, for example, are very popular in eastern world music such as middle eastern or from the far east, as it is the way the local music sounds and cannot be produced on fretted instruments. Classical string instruments in an orchestra and modern music also use fretless instruments.

There are many different styles of music. Musicians may mix and blend different styles in their creative process. A fretless instrument opens up another field of sound and music exploration. As the world becomes much more interconnected there is a growing interest in different styles of music from all around the world and the fusion between them.

Today, a musician who wishes to use a fretless instrument must either purchase a dedicated fretless instrument or modify a regular instrument into a fretless instrument. The latter process is a very involved, skillful and irreversible process which means if you modified your guitar into a fretless instrument, it is almost impossible to bring it back to its original state. One known method to convert an electric or bass guitar into a fretless one uses epoxy resin or polyurethane spray. Another method involves removing the frets. In both methods the resulting fretless guitar cannot be reconverted into a fretted guitar.

Thus, if a person just wanted to try out a fretless guitar, for example, to determine whether it suited him, he would need to spend a lot of money purchasing a new instrument or a great deal of time and expense converting his fretted guitar into a fretless guitar and if he then decided that he did not want a fretless instrument, he would need to convert it back into a standard one, which may be impossible or purchase a new instrument.

Attempts have previously been made to incorporate fretted and fretless modes of operation in the same instrument. Prior art ideas include the use of gearing mechanisms to adjust the position of the frets, the use of interchangeable fingerboards, one having frets and a second board being provided without frets, for example. U.S. Pat. No. 6,350,940 describes an instrument which may be played in either fretted or unfretted mode, which uses a separate fingerboard having a lever device for raising and lowering the fingerboard.

Prior art devices tend to have many disadvantages and drawbacks such as being expensive to produce and interfering with the ergonomics of the instrument, thereby making it more difficult to play.

Thus, there is a great need for a simple and inexpensive device for converting a fretted instrument, such as a guitar, into a fretless instrument and which is easy to assemble and disassemble.

SUMMARY OF THE INVENTION

The present invention is directed to a device for converting a fretted musical instrument into a fretless musical instrument and to a method for easily converting an instrument between fretted and fretless configurations.

The musical instrument has a plurality of frets embedded thereon and has a plurality of strings attached thereto. The device is configured to be insertable between the frets and the strings. The device is manufactured to match the dimensions of the musical instrument being converted so that it fits tightly and securely to the musical instrument.

Furthermore, the device does not interfere with the configurations of the frets and the strings when the device is inserted and/or removed.

Furthermore, the device may be configured to fit around the neck of the musical instrument and is securable by the application of pressure to both sides of the neck.

Alternatively, two-sided tape may be affixed to the device.

Alternatively, the device may be fitted to the musical instrument by means of a pair of elastic bands, each of the pair of elastic bands being attached to a pair of handles, each of the pair of handles being fitted to opposing sides of the musical instrument.

Furthermore, the present invention provides a method for converting a musical instrument having strings attached thereto and frets embedded thereon, into a fretless instrument. The method includes the steps of:

releasing the tension of the plurality of strings;

inserting a fretless device between the plurality of frets and the plurality of strings;

securely fitting the fretless device on to the musical instrument;

re-tightening the tension of the plurality of strings and re-tuning the fretless instrument.

Furthermore, the step of securely fitting the fretless device includes the steps of placing the fretless device onto the neck of the musical instrument and applying pressure to both sides of the neck.

Furthermore, prior to the step of securely inserting the fretless device the method includes the step of affixing two-sided tape to at least one side of the fretless device.

Alternatively, the step of securely fitting the fretless device included the steps of attaching a pair of handles, each of the pair of handles being fitted to opposite side of the musical instrument and securely attaching the fretless device to the musical instrument by means of a pair of elastic bands, each of the pair of elastic bands being attached to one of each pair of handles.

DESCRIPTION OF THE DRAWINGS

The present invention will be understood and appreciated more fully from the following description taken in conjunction with the appended drawings in which.

DESCRIPTION OF THE PREFERRED EMBODIMENTS

The present invention relates to a stringed instrument that is easily convertible between fretted and fretless playing configurations.

Reference is now made to FIGS. 1-4 and FIGS. 6-7, which are schematic views of a fretless device 10, constructed and operative in accordance with an embodiment of the invention. The fretless device 10 is configured to fit a musical instrument, such as a guitar 12.

Figure 1:
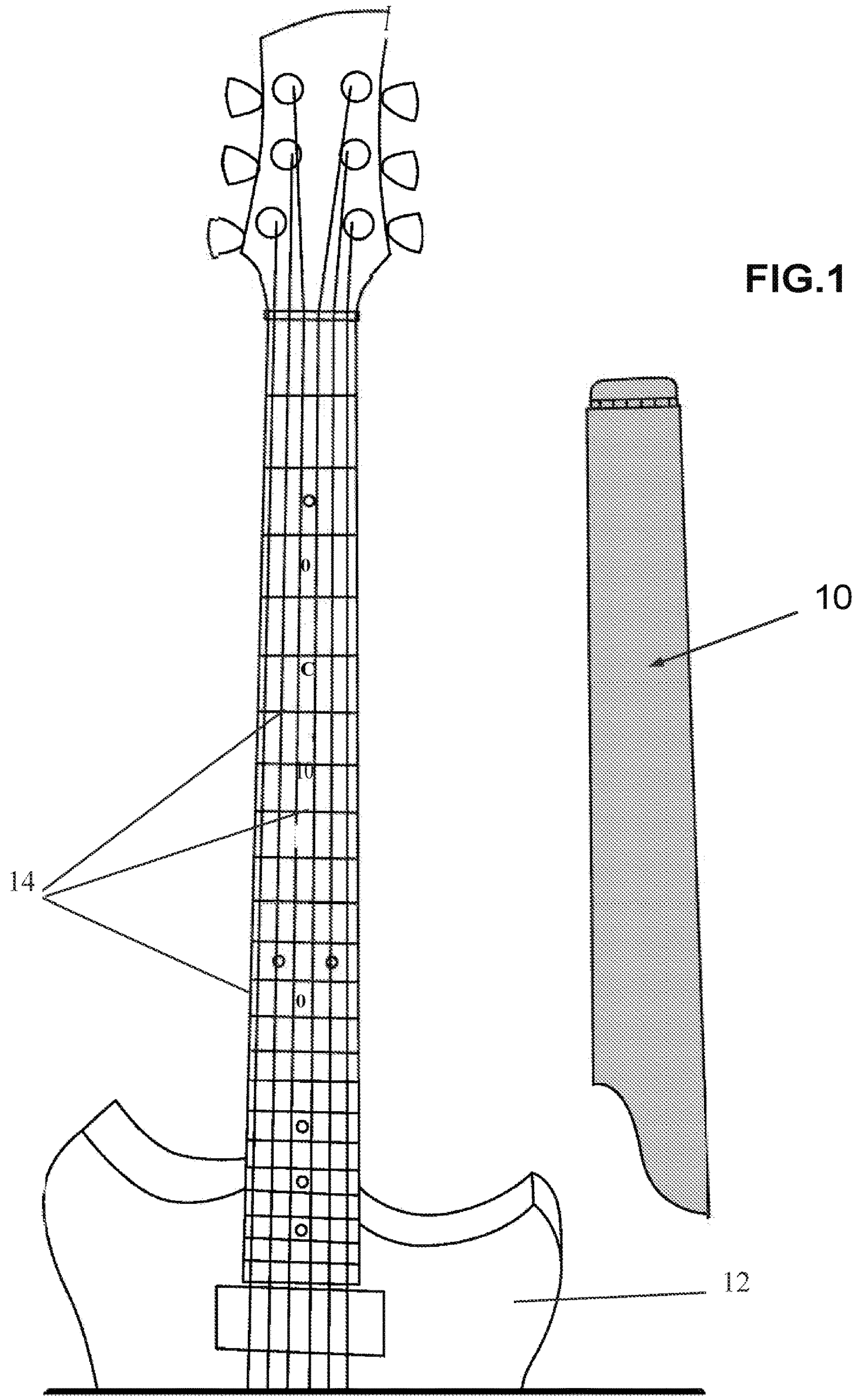
FIGS. 1-4 are schematic views of a fretless device, constructed and operative in accordance with an embodiment of the invention.
Figure 2:
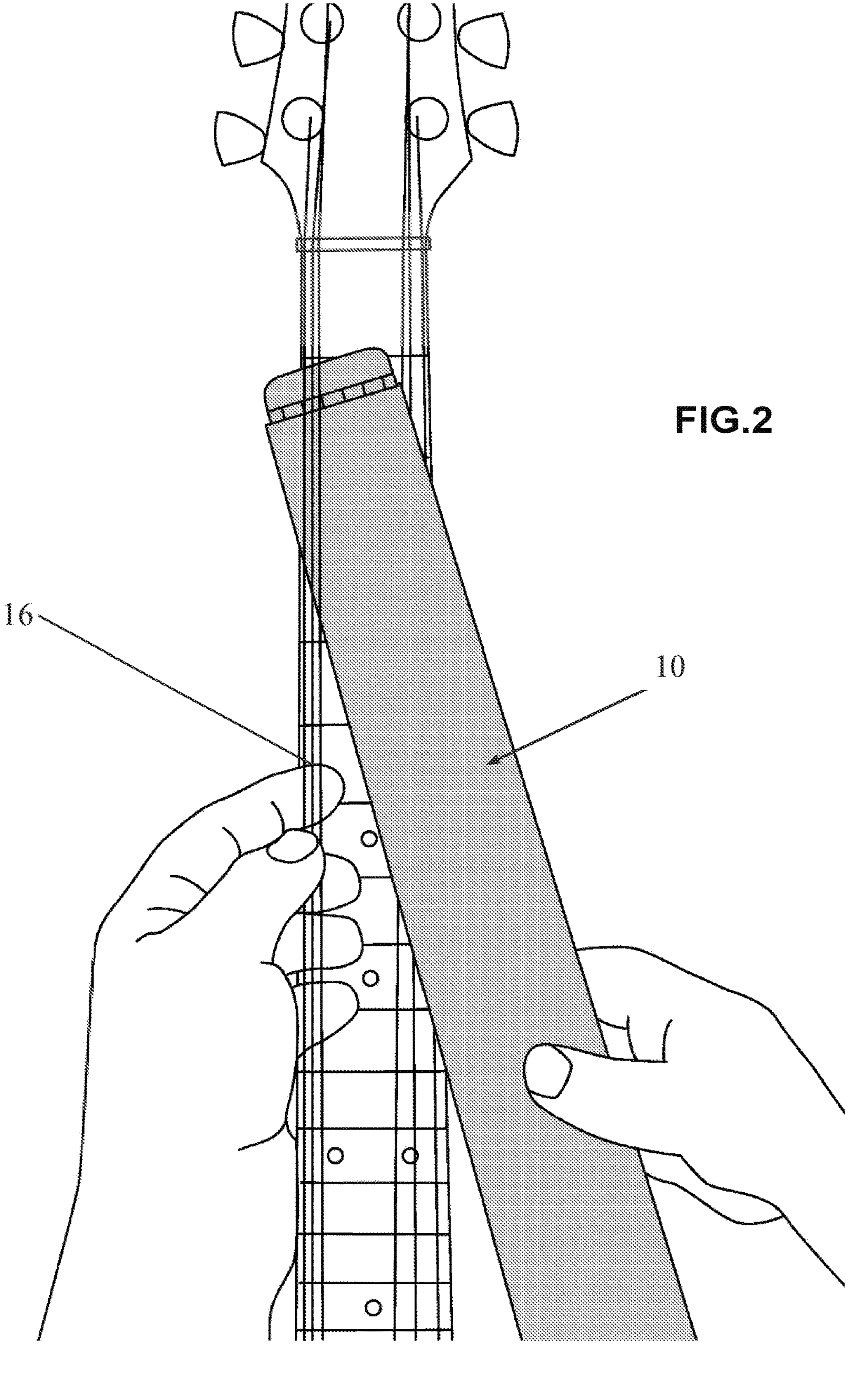

A typical guitar 12 having a plurality of frets 14 is illustrated in FIG. 1. A fret is commonly a thin strip of metal (often made of steel, alloy, or brass), which is embedded on the fingerboard or neck of the guitar. The fret is used to change the vibrating length of a particular string to create a specific tune or note.

A standard fretless instrument such as a guitar, is a guitar having a fingerboard without frets, typically a standard instrument that has had the frets removed.

For the purposes of example and illustration only, the stringed instrument refers to a guitar. However, it will be appreciated that the fretless device of the present invention may be configured to fit any other stringed instrument.

Figure 3:
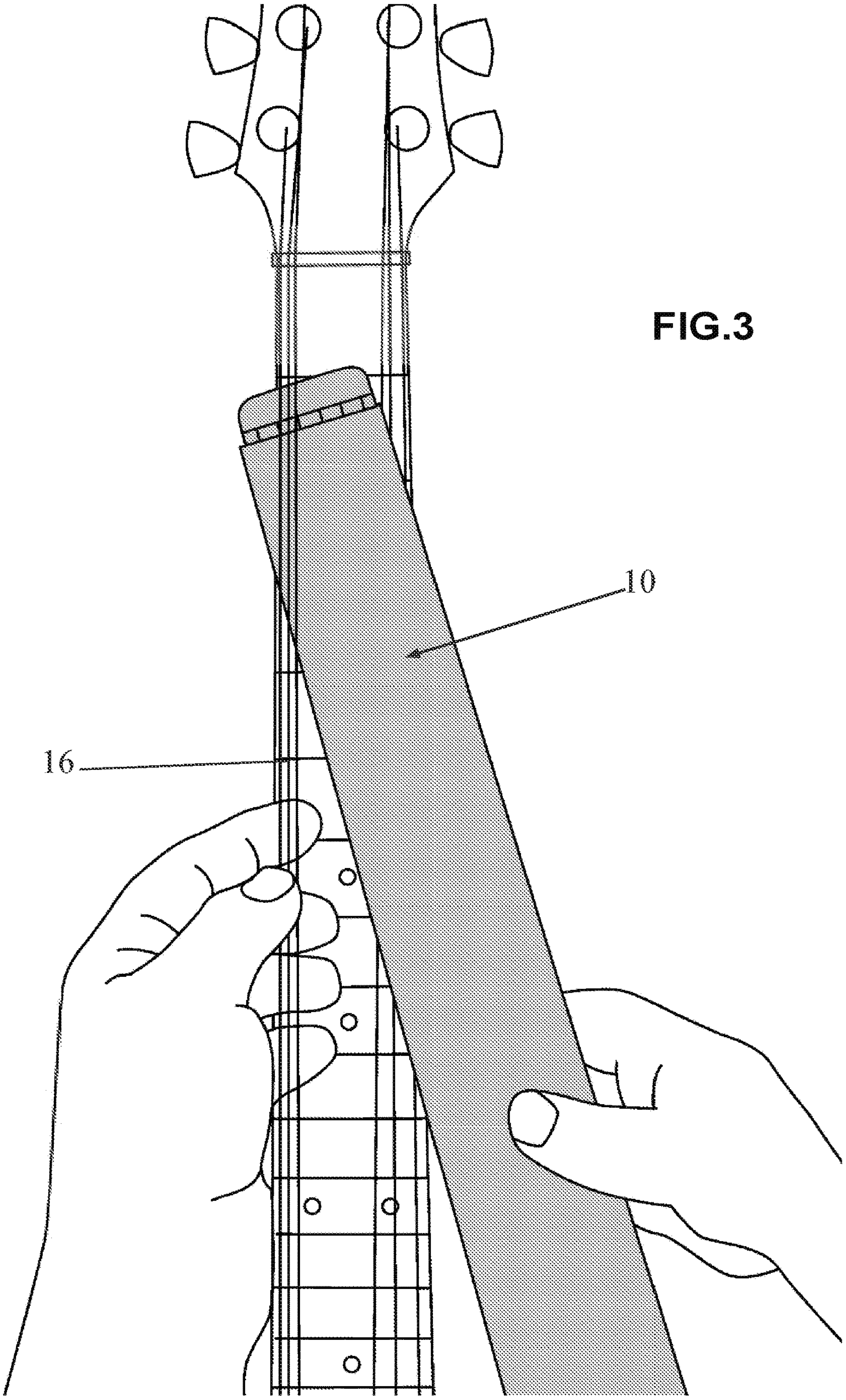
Figure 4:
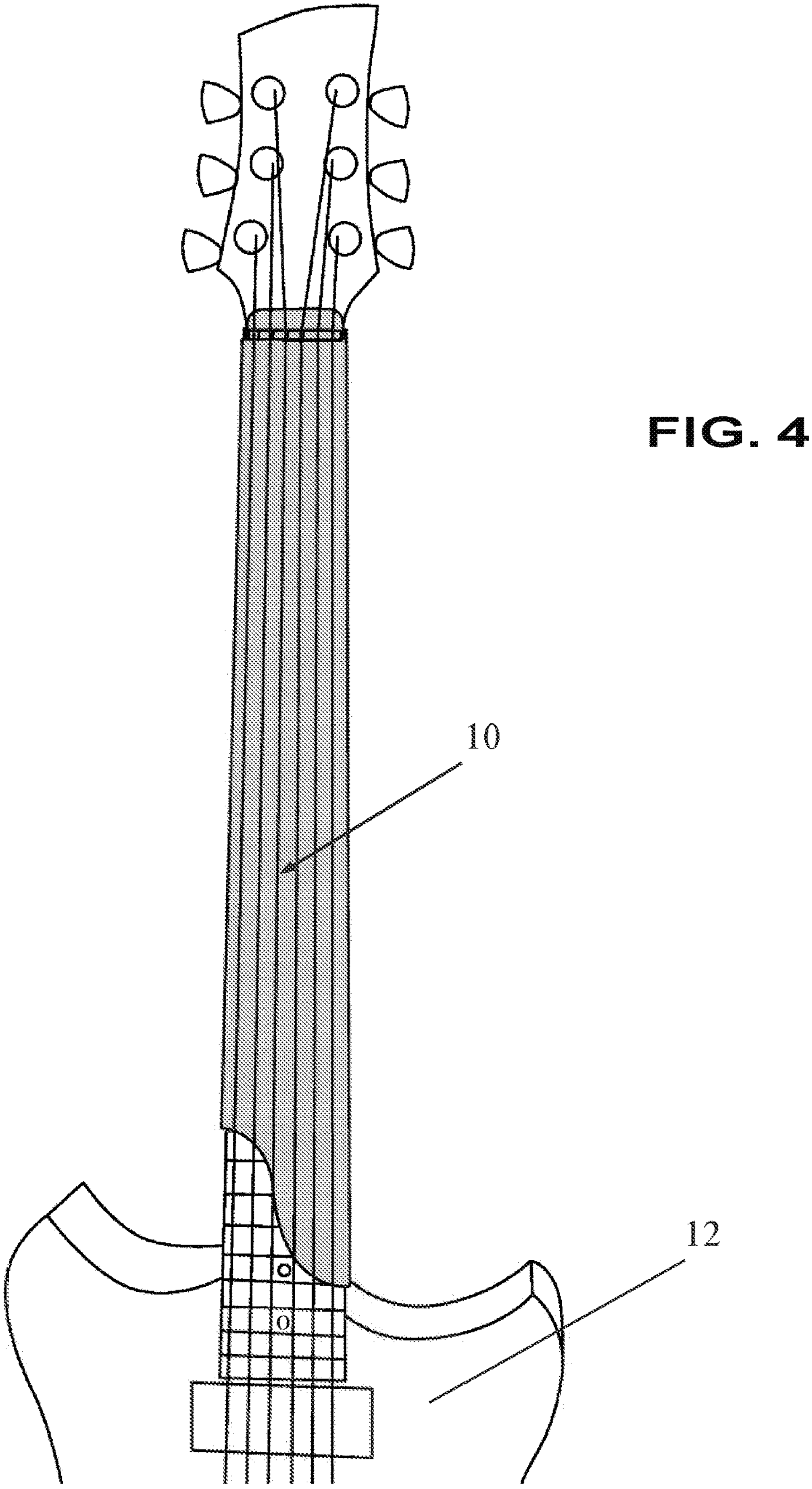

The fretless device 10 is configured to fit the musical instrument being converted. As illustrated in the figures, the fretless device 10 seats tightly between the neck and the strings and transforms the fretboard into a fretless neck. FIGS. 3 and 4 illustrate the musical instrument (a bass guitar, for example) 12 having the fretless device 10 secured in place.

The fretless device 10 may be constructed from any suitable material having durability and an element of flexibility, such as polycarbonate (PC) or other plastic or polymeric material. The fretless device 10 is preferable transparent (see FIGS. 6 and 7) but may be non-transparent. For clarification purposes only, the device 10 is shown in FIGS. 1-5 as being non-transparent.

The fretless device 10 is flexible and may be constructed with very accurate and precise measurements matching the instrument to which it is being affixed. The fretless device 10 is configured to fit very snugly onto the guitar, so that the device 10 raps itself around the neck of the guitar and is secured by the application of slight pressure to both sides of the neck.

Occasionally, the dimensions of the neck of mass-produced guitars of a particular make may vary slightly. In this case, two-sided stickers 22 (or foam inserts), for example, (FIG. 6) or similar may be applied to the fretless device to compensate for the extra width.

The strings 16 of the instrument 12 may be raised slightly by the fretless device 10 to compensate for the additional height of the device 10.

Figure 7:
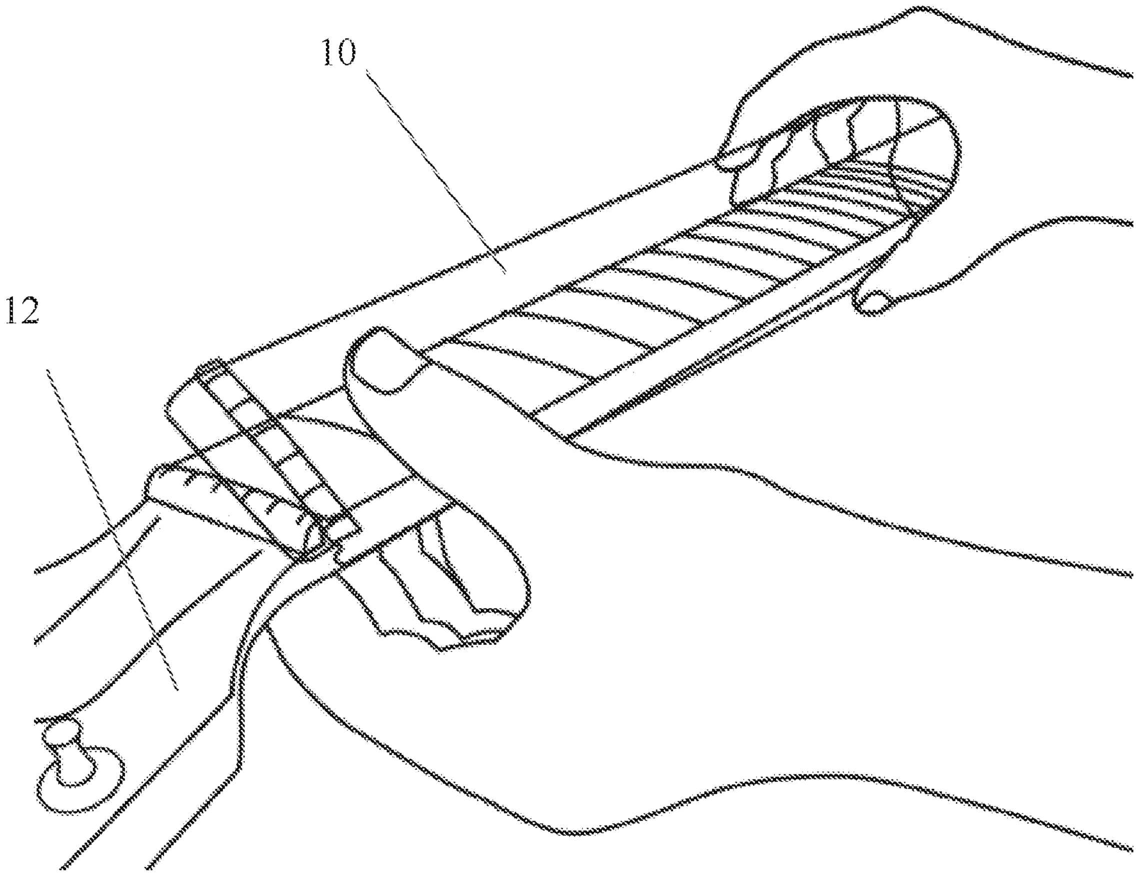
FIG. 7 is a schematic view, showing the method of fitting the fretless device of FIG. 6, constructed and operative in accordance with a further embodiment of the invention.

The method of converting the fretted guitar 10 to a fretless guitar may be described as follows:

Step 1: the tension of the strings 16 is released sufficiently to allow the strings 16 to be moved aside (FIG. 3);

Step 2a: the fretless device 10, which has been configured to match the shape of the instrument (guitar) 12, is placed onto the neck of the guitar 12 under the strings 16 (FIG. 4);

Step 2b (alternatively): If the device is slightly wider than the guitar neck, the two-sided stickers 22 (FIG. 6) are fitted to one side of the device 10 and is placed onto the neck of the guitar 12, the side having the stickers being applied first, as shown in FIG. 7;

Step 4: the strings 16 are then re-tightened and tuned.

To convert the fretless guitar back to the original fretted guitar, the strings 16 are slackened and the fretless device 10 removed. The strings may then re-tightened and the guitar 12 retuned.

Figure 5:
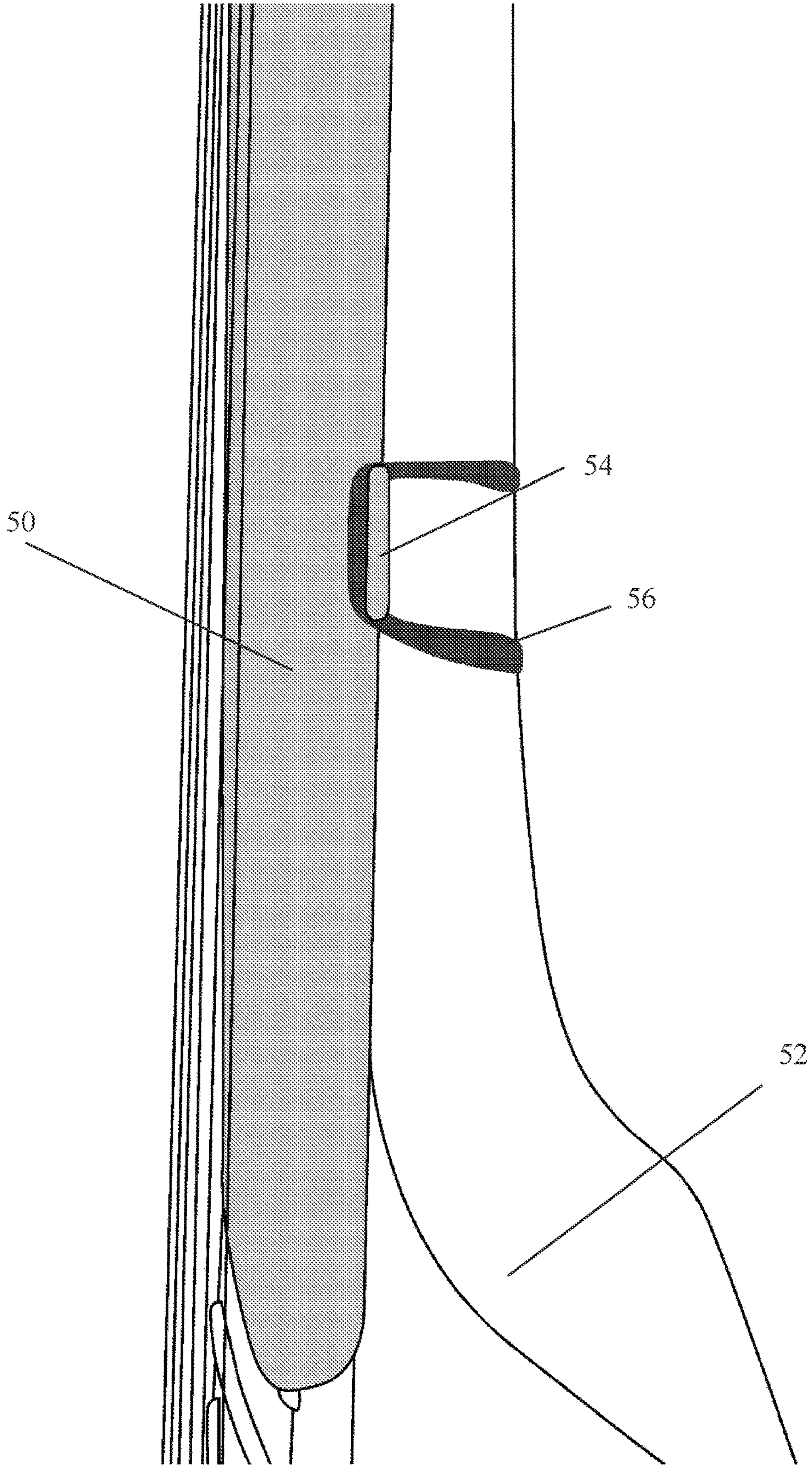
FIG. 5 is a schematic view of a fretless device, constructed and operative in accordance with a further embodiment of the invention.
Figure 6:
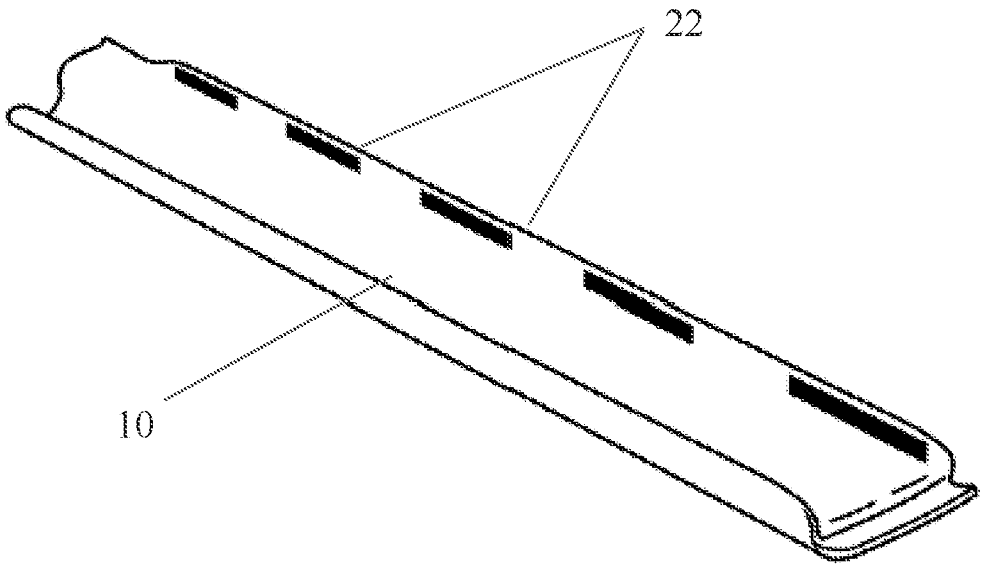
FIG. 6 is a schematic view of a fretless device of FIG. 1, having two-sided tape attached thereto, constructed and operative in accordance with a further embodiment of the invention.

Reference is now made to FIG. 5, which illustrates a fretless device, generally designated 50, constructed and operative in accordance a further embodiment of the invention which may be used for conversion of an electric guitar 52 into a fretless electric guitar. For the purposes of example and illustration only, the stringed instrument refers to an electric guitar. However, it will be appreciated that the fretless device of the present invention may be configured to fit any other stringed instrument.

The fretless device 50 is configured to fit the instrument being converted. The device 50 seats tightly between the neck and the strings and transforms the fretboard into a fretless neck.

The fretless device 50 may be constructed from any suitable material having durability and an element of flexibility, such as PC or other plastic material.

In the embodiment, the fretless device 50 comprises at least one pair of handles 54 formed on each side of the fretless device 50. A pair of elastic bands 56 may be attached to the handles 54.

In the alternative embodiment of FIG. 5, the fretless device 50 may be secured to the guitar 52 by rubber bands 54 or any other suitable means attached to the handles 56, prior to the strings being retightened and tuned.

To convert the fretless guitar back to the original fretted guitar, one simply detaches rubber bands 54 from the fretless device 50, releases the strings, removes the fretless device 50, and then re-tightens and re-tunes the fretted guitar 52.

One of the advantages of the fretless devices (10,50) of the present invention is that the process of converting the guitar from fretted to fretless and vice-versa is simple and quick. The process does not harm the original instrument. The fretless devices (10,50) effectively allow a musician to be able to play in fretted and fretless modes while only needing to own a single instrument.

It will be appreciated that the present invention is not limited by what has been described hereinabove and that numerous modifications, all of which fall within the scope of the present invention, exist. Rather the scope of the invention is defined by the claims, which follow:

The invention claimed is:

1. A device for converting a first musical instrument into a second musical instrument, said first musical instrument having a plurality of frets embedded thereon and having a plurality of strings attached thereto;

wherein said device is configured to be insertable between said plurality of frets and said plurality of strings, said plurality of frets remaining in place;

thereby allowing said second musical instrument to be playable as a fretless musical instrument.

2. The device of claim 1, wherein the dimensions and shape of said device conform to the dimensions of the first musical instrument being converted, thereby to fit the musical instrument tightly and securely.

3. The device of claim 1, wherein said device is manufactured from a flexible and durable material.

4. The device of claim 3, wherein said flexible and durable material comprises one of group including polycarbonate, polymeric or plastic material.

5. The device of claim 1, wherein said plurality of frets and said plurality of strings maintain their original positions on the first musical instrument when the device is inserted and/or removed.

6. The device of claim 1, wherein said device is configured to fit around the neck of the first musical instrument and is securable by the application of pressure to both sides of the neck.

7. The device of claim 1, wherein said device is securely fitted to said first musical instrument by means of a pair of elastic bands, each of said pair of elastic bands being attached to a pair of handles, each of said pair of handles fitted to opposing sides of said first musical instrument.

8. A method for converting a musical instrument, having a plurality of frets embedded thereon, into a fretless instrument, said musical instrument having a plurality of strings attached thereto, comprising the steps of:

releasing the tension of said plurality of strings;

inserting a fretless device between said plurality of frets and said plurality of strings;

securely fitting the fretless device on to the musical instrument;

retightening the tension of said plurality of strings and re-tuning the fretless instrument.

9. The device of claim 1, wherein said device is removable from said converted instrument; whereby the musical instrument reverts to the original first musical instrument having a plurality of frets; thereby allowing the instrument to again be played as a fretted musical instrument.

10. The method of claim 8, wherein said converted fretless instrument is restorable to the original musical instrument, having a plurality of frets by removing said fretless device;

thereby allowing the instrument to again be played as a fretted musical instrument.

* * * * *